(12) United States Patent
Love, II et al.

(10) Patent No.: US 8,267,726 B1
(45) Date of Patent: Sep. 18, 2012

(54) MODULAR DIGITAL SIGNAL CROSS-CONNECT SYSTEM

(75) Inventors: Grayling A. Love, II, Liberty Lake, WA (US); Bradley Fuller, Nine Mile Falls, WA (US); Paul A. Knight, Spokane, WA (US)

(73) Assignee: Telect Inc., Liberty Lake, WA (US)

( * ) Notice: Subject to any disclaimer, the term of this patent is extended or adjusted under 35 U.S.C. 154(b) by 0 days.

(21) Appl. No.: 13/085,784

(22) Filed: Apr. 13, 2011

(51) Int. Cl.
*H01R 33/22* (2006.01)
(52) U.S. Cl. .................................... 439/668
(58) Field of Classification Search ............... 439/668, 439/946, 61, 540.1, 76.1
See application file for complete search history.

(56) References Cited

U.S. PATENT DOCUMENTS

| | | | |
|---|---|---|---|
| 4,840,568 A * | 6/1989 | Burroughs et al. | 439/49 |
| 6,123,577 A * | 9/2000 | Contois et al. | 439/535 |
| 6,636,519 B1 * | 10/2003 | Walsh et al. | 370/401 |
| 7,207,846 B2 * | 4/2007 | Caveney et al. | 439/676 |
| 2002/0182932 A1 * | 12/2002 | Petrie et al. | 439/540.1 |
| 2006/0019548 A1 * | 1/2006 | Baker et al. | 439/668 |

* cited by examiner

*Primary Examiner* — Renee Luebke
*Assistant Examiner* — Harshad Patel
(74) *Attorney, Agent, or Firm* — Lee & Hayes, PLLC

(57) ABSTRACT

A modular telecommunications device that may be configured with a variety of connector types that enable any telecommunications equipment to route signals through the telecommunications device. The device includes a quad jack frame, a main printed circuit board and an interchangeable back plate that can be replaced by another interchangeable back plate that includes a different connector type. A secondary printed circuit board is included in the interchangeable back plate. The incoming power to the device is provided to the main printed circuit that distributes power throughout the device.

24 Claims, 5 Drawing Sheets

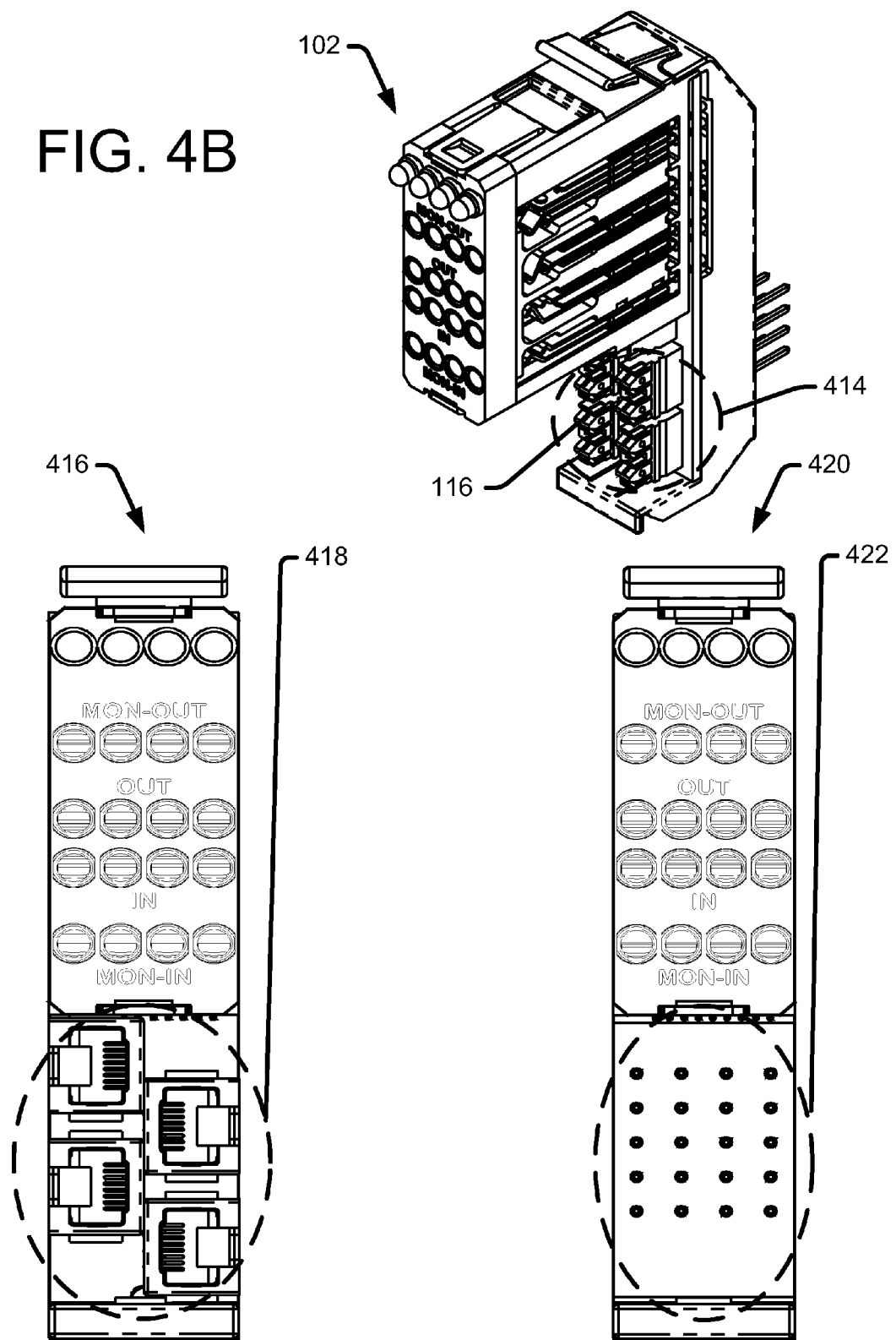

MODULAR DIGITAL SIGNAL CROSS-CONNECT SYSTEM

BACKGROUND

Telecommunication cross-connect jack panels provide front access to telecommunication circuits for routing, rerouting, repairing, and circuit monitoring. As opposed to directly hard-wiring telecommunication equipment, a Digital Signal Cross-connect ("DSX") system allows for connected equipment to terminate at one or more central locations. This allows for easier adding, removing or rearranging of circuit connections among the equipment in the telecommunications network. Among other benefits, DSX offers the ability to test, monitor and repair equipment that is terminated at the DSX central location.

A central DSX location typically includes one or more telecommunication racks, which are referred to as bays when loaded with DSX equipment. Racks are designed to hold one or more chassis, panels, terminal strips, terminal blocks, test and maintenance equipment, active equipment (e.g., radios, servers, etc.), and/or other telecommunications equipment.

An important consideration in telecommunication equipment is circuit density and interoperability. Most central telecommunication locations have limited space and are hard wired for the type of interface connections used in a telecommunications system.

SUMMARY

This summary is provided to introduce aspects of a telecommunication apparatus and a Digital Signal Cross-connect (DSX) module, which are further described below in the Detailed Description. This summary is not intended to identify essential features of the claimed subject matter, nor is it intended for use in determining the scope of the claimed subject matter.

In one instance, a DSX module may include a jack frame coupled to a main printed circuit board that includes a front cross connect field. The DSX module may also include an interchangeable back plate having an equipment input/output field and a secondary printed circuit board. The interchangeable back plate may be coupled to the main printed circuit board or the jack frame, or both. The DSX module may be configured to accept interchangeable back plates that facilitate the use of different interface connection types.

By way of example and not limitation, the DSX module may include an equipment input/output field with RJ-48 connectors. If the RJ-48 connectors are no longer needed, the interchangeable back plate may be removed from the DSX module and replaced with another back plate that includes Insulation Displacement Connectors (IDCs). In doing so, the jack frame and the main printed circuit are reused with the new interchangeable back plate, and the DSX module may be placed back in service on a telecommunications chassis. In some instances, DSX modules may be reconfigured in the field, while in other instances the DSX modules may be configured or reconfigured prior to deployment in the field.

In another instance, the DSX module may be configured to receive power from a telecommunications chassis via the main printed circuit board. Power may be distributed throughout the DSX module via the main printed circuit board. For example, the secondary printed circuit board may receive power from the main printed circuit board to perform various functions related to the equipment input/output field, such that telecommunications signals may be routed through DSX module.

BRIEF DESCRIPTION OF THE DRAWINGS

The detailed description is described with reference to the accompanying figures. The use of the same reference numbers in different figures indicates similar or identical items.

FIG. 4B shows an exemplary telecommunications module with various configurations for the front cross-connect field of the DSX module.

DETAILED DESCRIPTION

This disclosure is directed to a device with interchangeable modules that is installed in a high-density telecommunications chassis. The device may also be referred to as a DSX module. In some implementations, the interchangeable modules may include connection ports of various configurations.

Traditionally, DSX modules have included front cross connect fields and equipment input/output fields upon which digital and analog signals are routed through the DSX module. Typically, both fields have been hard wired into the DSX module. For instance, if the DSX module needed a different type of connector for the equipment field, the entire module would have to be replaced. This application describes DSX modules that include, among other things, an interchangeable back plate that includes a secondary printed circuit board and an equipment field. Hence, when different connector types are required for the equipment field, the interchangeable back plate can be replaced instead of the entire DSX module. This allows a telecommunications service provider to stock a smaller number of modules, since the modules can be configured and/or reconfigured with different back plates on an as-needed basis.

Some conventional DSX modules have had a main printed circuit board and a secondary printed circuit board, and power to the DSX module was provided through the secondary circuit board to the main circuit board. This application describes an example DSX module in which power is supplied to the main printed circuit board, and the secondary printed circuit board receives power from the main printed circuit board. Accordingly, if an interchangeable back plate of the example DSX modules described herein is exchanged within another back plate, the primary power connection to the DSX module is not replaced. Therefore, the DSX power connectors are more likely to remain consistent since the power connectors are not changed each time the interchangeable back plate is replaced.

The DSX device for the high-density telecommunications chassis of the present disclosure allows reconfiguration of the equipment input/output fields without replacing the entire DSX module. Further, receiving incoming power to the main circuit board enables the equipment connector fields to be replaced without changing the connectors used to receive power for the DSX module. Moreover, the present disclosure describes techniques and configurations for a modular DSX device. The techniques and devices are described in the context of fiber optic connectivity telecommunications environment. However, the described techniques and devices can be implemented in a multitude of other contexts, such as a copper-based connectivity telecommunications environment.

Exemplary Chassis and Device

Figure 1:
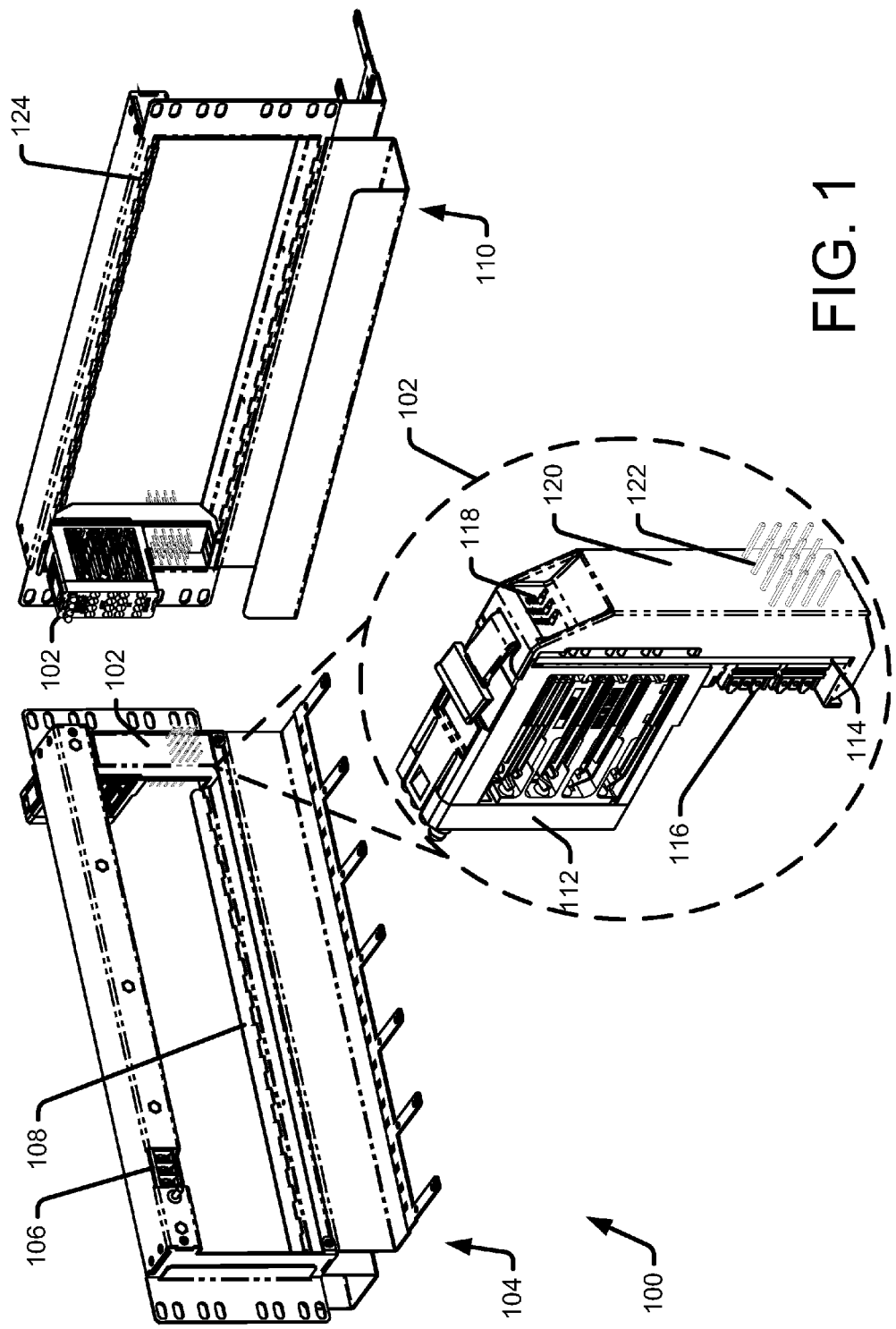
FIG. 1 illustrates an exemplary environment for a telecommunications system that includes a chassis and a telecommunications module.

FIG. 1 illustrates an exemplary implementation of a chassis 100 and a telecommunications device 102. The rear isometric view of the chassis 104 includes an incoming power connection 106 to the chassis 104 and a module bay 108. In this instance, the module bay 108 is shown including a single device 102, however in other implementations a plurality of devices may be installed in the module bay 108. The installation of the device may be accomplished by a quick disconnect technology or any other connection technology that enables the device 102 to be installed and removed multiple times from the module bay 108 during its lifetime.

The front isometric view of the chassis 110 shows that each module bay 108 comprises a plurality of electrical ports 124 that provides electrical power to the devices installed in the module bay 108. The power for the electrical ports 124 are provided from the incoming power port 106. Further, not only will the chassis 110 accommodate multiple devices, but the chassis 110 may be installed in a telecommunications rack (not shown) that may accommodate more than one chassis at a time. In one specific example, the chassis may have a vertical dimension of about 5.25 inches (about 13.33 centimeters), i.e., about 3 rack units.

In one implementation, the device 102 may include a quad jack frame 112, which includes four rows of jacks, and is coupled to a main printed circuit board 114 that includes a front cross-connect field 116. In this implementation, the cross-connect field includes IDC connectors. The main circuit board 118 also includes a power input 118 that is in electrical communications with the chassis power connection 106 when the device 102 is installed in the module bay 108 of the chassis 104. The device 102 further includes an interchangeable back plate 120 that comprises the equipment input/output field 122. In this implementation, the equipment field 122 includes wire wrap connectors. However, the connector types for the cross connect field 116 and the equipment field 122 may vary, as discussed in detail with reference to FIGS. 4A and 4B.

Figure 2:
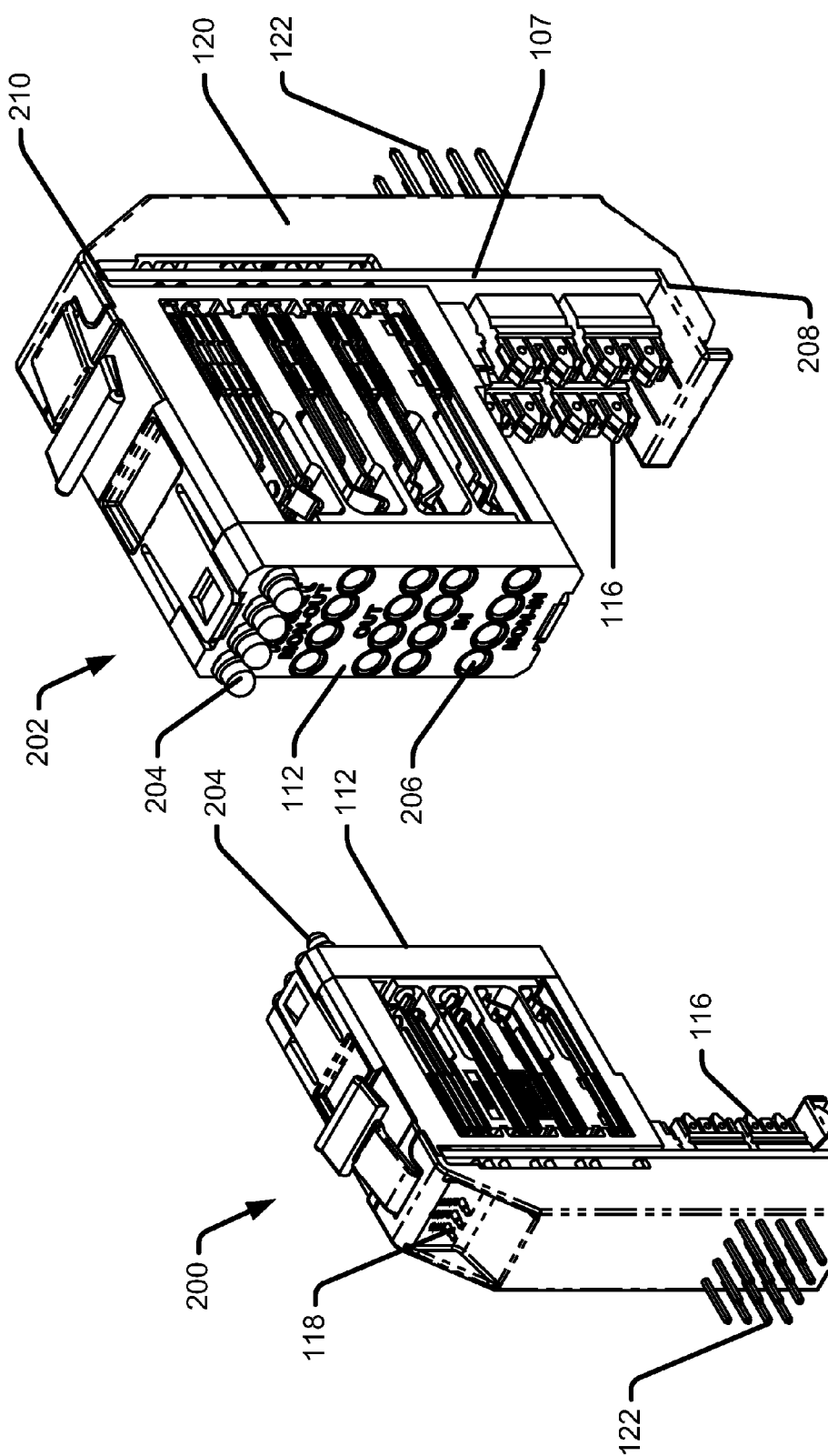
FIG. 2 shows an exemplary telecommunications module from an isometric front view and an isometric rear view.

FIG. 2 includes an isometric front view 200 of device 102 and an isometric rear view 202 of device 102. In each view, the quad jack frame 112 includes a plurality of light emitting diodes (LED) 204 which provide an indication of signal continuity and/or signal activity for the device 102. In one implementation, the LEDs are blue. In another implementation, the LEDS may be red, yellow, green, amber, or any other suitable color.

In this implementation, the quad jack frame 112 also includes a plurality of bantam ports 206 on the front side of the device 102. The bantam ports 206 may send and receive signals from a main distribution frame (not shown) and can be used for troubleshooting the connections between the device 102 and other devices located in the same bay, or in another bay of the same rack and/or in other racks (not shown).

In this implementation, the cross-connect field 116 includes IDC connectors. The cross-connect field 116 may be coupled to other devices in the same bay 108 or to other DSX devices in a same rack or other adjacent or distant racks (not shown) in a telecommunications network. The interchangeable back plate 120 may also include a secondary printed circuit board (not shown) that interfaces with the equipment field 122. The interchangeable back plate 120 may be connected to the main circuit board 114 using snap connection 208 and 210. The snap connection 208/210 may include plastic push-fit connectors or any other quick connect-disconnect device that enables the interchangeable back plate 120 to be connected and disconnected repeatedly from the main printed circuit board 114 or quad jack frame 112. In the illustrated example, element 208 comprises a slot which receives a tab of the chassis 104, and element 210 comprises a T-shaped tab, which snaps into a notch in the chassis 104. In another implementation, the interchangeable back plate 120 may be coupled to the quad jack frame using a dovetail type joint at the top of the module 102 and to the main printed circuit board 114 at the bottom of the module 102 using a snap type connector.

In another implementation, the jack frame 112 may be a tri jack frame that includes three rows of bantam ports instead of four rows as illustrated in the quad jack frame. In still other implementations, modules may include jack frames including any number of rows of bantam ports. Also, while the examples described herein employ bantam ports, in other examples, other types of ports may be used.

Figure 3:
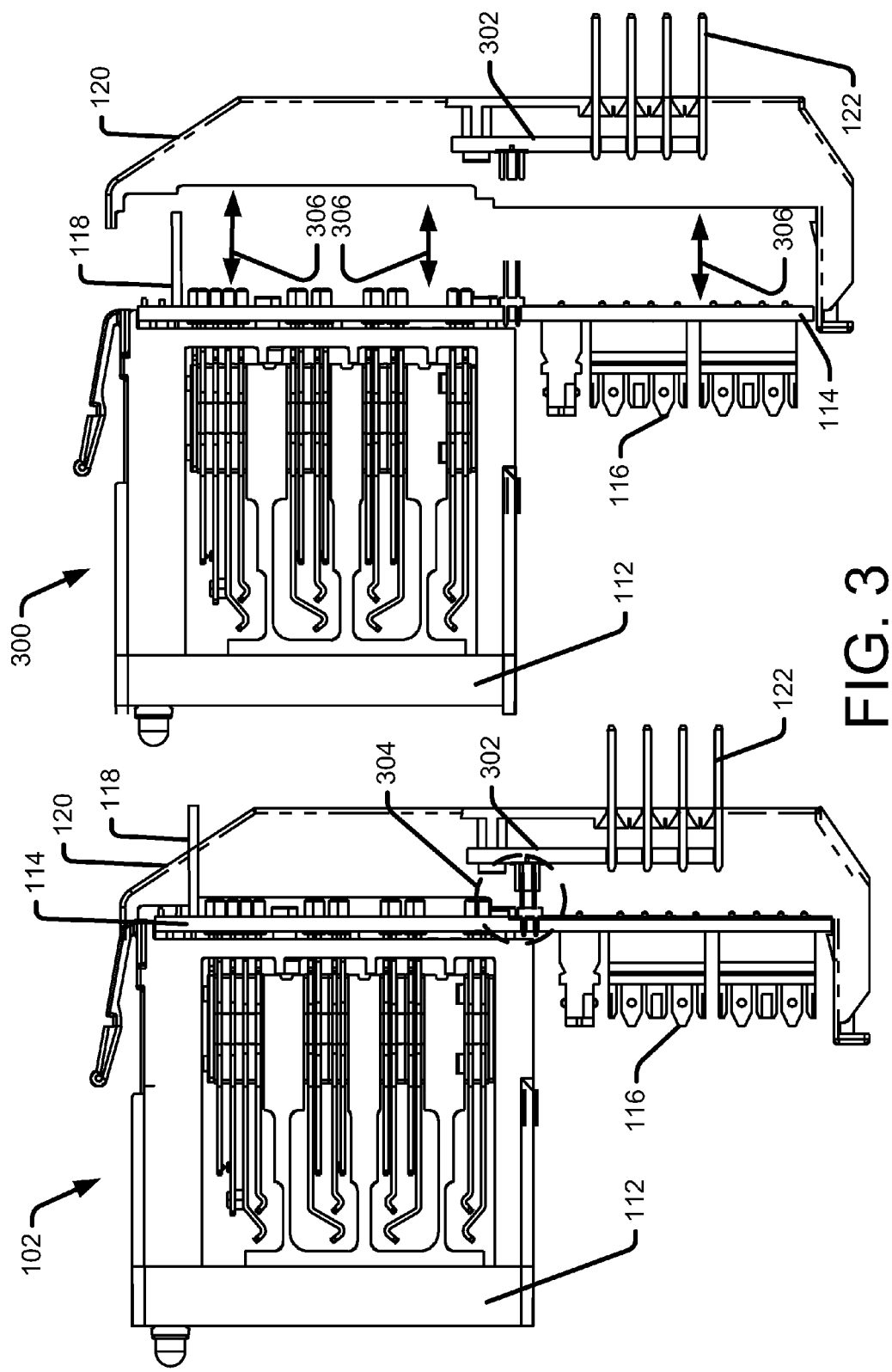
FIG. 3 shows an exemplary telecommunications module with a quad jack frame, a main printed circuit board, and an interchangeable back plate that includes a second printed circuit board from an isometric front view and an isometric rear view.

FIG. 3 shows a side view of device 102 with the back plate 120 installed (on the left of the page) and a side view 300 of device 102 in which the interchangeable back plate 120 is disconnected from the quad jack frame 112 and main printed circuit board 114 (on the right of the page). In both side views, the interchangeable back plate 120 is shown in a cut away view that shows the secondary printed circuit 302 being coupled to the back plate. In a first implementation, the secondary printed circuit board 302 is coupled to the connectors of the equipment field (e.g., the wire wrap connectors 122) and the electrical signals are routed through the equipment field connectors 122 and the secondary board 302 to the main circuit board 114. The power input 118 is attached to the main printed circuit board 114, and in this implementation, the connectors for the power input 118 pass through the interchangeable back plate 120 to make contact with the electrical port 124 of the chassis 110 as described in FIG. 1. Further, communication signals are provided to the secondary printed circuit board 302 via an electrical connection 304 with main printed circuit board 114. Also, communication signals routed through the device 102 may use the electrical connection 304 to route signals between the various fields. For example, signals may be routed between the quad jack frame 112 and the front cross connect field 116 to the equipment field 122 via the electrical connection 304.

In another illustrated side view 300, the jack frame 112 and the main printed circuit board 114 are detached from the interchangeable back plate 120, as noted by the arrows 306, into two separate components. In this way, a different interchangeable back plate (not shown) with different equipment field connectors may be attached to the main circuit board 114, or the interchangeable back plate 120 may be reattached to the main circuit board 114. Additional connector configurations for the interchangeable back plate 120 will be discussed in the description of FIG. 4A. Therefore, if the end equipment (not shown) that may be connected to the equipment field 122 is changed or altered in a manner that requires different wiring connectors, then only the interchangeable back plate 120 would need to be replaced instead of the entire device 102. The foregoing configuration provides a hardware cost savings for the operators of the telecommunications network. Additionally, reusing the quad jack frame 112 and the main circuit board 114 reduces a likelihood of introducing new parts that may be susceptible to infant failure rates that existing components have already overcome. In other words, reusing parts that have a proven track record introduces less variability in the operations of the telecommunications network.

Exemplary Device Configurations

Figure 4A:
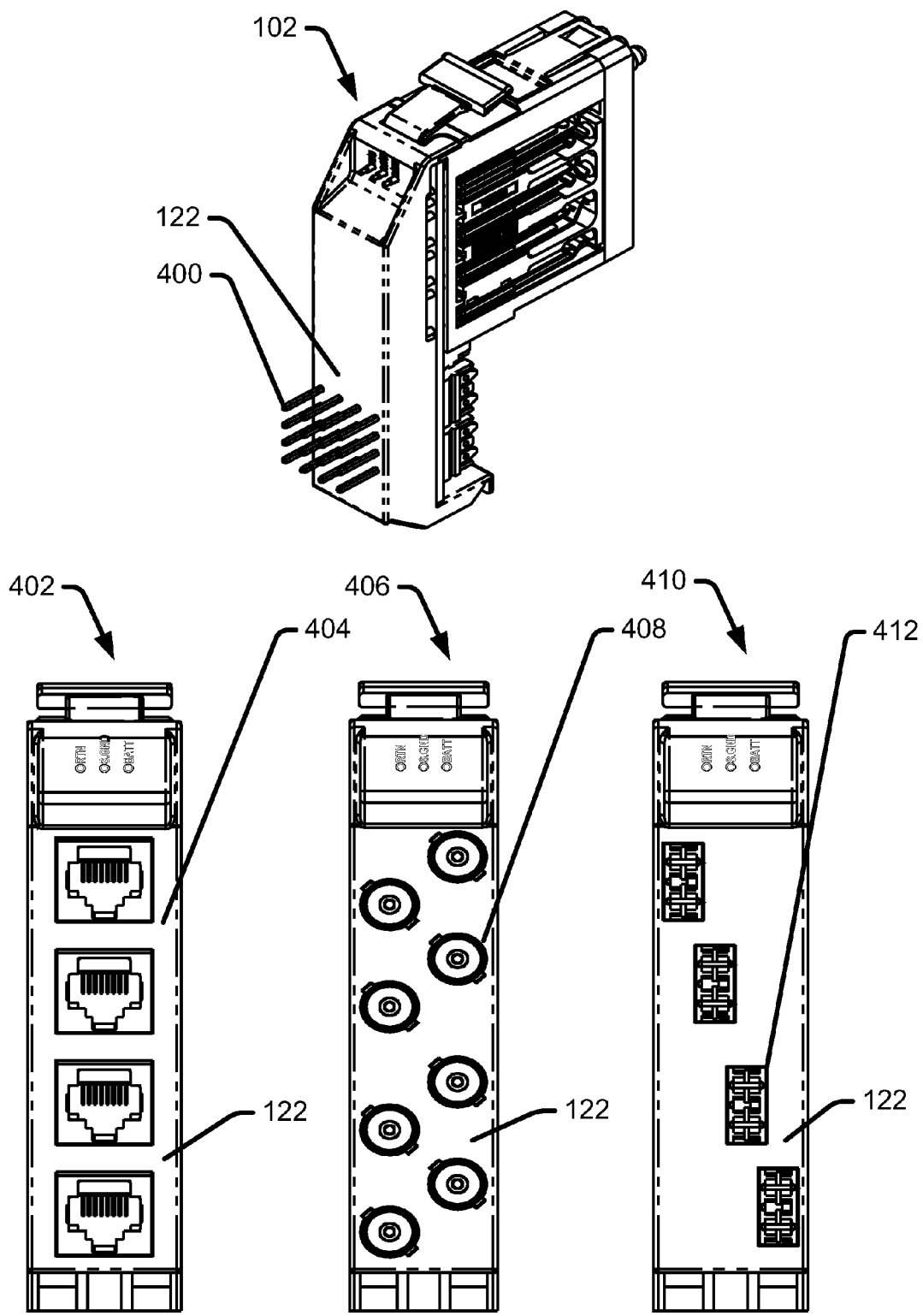
FIG. 4A shows an exemplary telecommunications module with various configurations for the interchangeable back plate.

FIGS. 4A and 4B include illustrative examples of connectors that may be used for the cross-connect field 116 and the equipment field 122 of device 102. Generally, the type of connectors used depends on the applications of the end user. Although several types of connectors are described herein, the scope of the claims should not be limited to these specific examples. Any type of connector that may used to connect telecommunications equipment may be integrated into the cross-connect field 116 or the equipment field 122.

FIG. 4A provides several examples of various equipment input/output field 122 configurations for device 102. In the first example, device 102 includes wire wrap connectors 400. In this implementation, copper wire is wrapped around the wire wrap connectors 400 to form a gas/air tight connection that is also resistant to vibrations.

In another implementation, device 402 includes RJ-48 connectors 404 in the equipment field 122. RJ-48 connectors are generally a telephone connector that includes up to eight wires. Although RJ-48C connectors may be used for T1 lines (not shown) that transmit large amounts of data between and among telecommunications networks (not shown).

In another implementation, device 406 includes Bayonet Neill-Concelman connector (BNC) 408 in the equipment field 122. BNC connectors 408 are coupled to coaxial cables configured to receive Radio Frequency (RF) signals that may be in consumer electronics devices or video devices. For example, the BNC connector may be configured to process both analog and serial digital interface video transmissions.

In yet another implementation, device 410 includes IDC connectors 412 in the equipment field 122. IDC connectors 412 use a connection process that employs a tool that forces the wire through a split terminal that strips the insulation and makes contact with the metal conductor forming a reliable gas-tight connection that is corrosion resistant.

The device 102 may implement any of the connectors described above; however, the types of connectors that may be used to populate the equipment field 122 are not limited to the connectors described above. Again, any type of connectors used in the electronic or telecommunication fields may be incorporated into the equipment field 122.

FIG. 4B shows the front cross-connect field 116 of devices 102, 416, and 420, and a plurality of connector types that may be implemented in the cross-connect fields 116. The types may include IDC 414, RJ-48 418, and wire wrap 422 connectors. These connectors are similar to the connectors described in FIG. 4A, but they are located in the cross connect field 116 in these embodiments.

In some implementations of the device 102, the cross-connect fields and the equipment fields may incorporate different types of connectors or they may include the same type of connectors. The decision of which connectors to use is based upon the different types of equipment that are interfaced with the device 102. Accordingly, almost any type of connector used in the telecommunications industry may be incorporated into cross-connect field 116 or the equipment field 122. In one example, the module may have dimensions of about 1.00" to about 1.00" wide, about 4.93" to about 4.93" tall, and about 3.69" to about 3.92" deep.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunications module comprising:
   a jack frame including a plurality of bantam jack ports;
   a main printed circuit board configured to receive power for the telecommunications module and being coupled to the jack frame;
   a secondary printed circuit board configured to receive power from the main printed circuit board;
   a first replaceable back plate of the telecommunications module including a first equipment input/output field comprising a plurality of connectors of a first connection type that is interchangeable with a second replaceable back plate including a second equipment input/output field comprising a plurality of connectors of a second connection type different from the connectors of the first connection type; and wherein the first replaceable back plate is coupled to a back side of the main printed circuit board and the secondary printed circuit board.

2. The telecommunications module of claim 1, further comprising
   a front cross connect field coupled to the main printed circuit board.

3. The telecommunication module claim 2, wherein the front cross connect field comprises a plurality of RJ-48 connectors.

4. The telecommunications module of claim 1, wherein the jack frame is coupled to a front side of the main printed circuit board and the secondary printed circuit board is coupled to a backside of the main printed circuit board.

5. The telecommunications module of claim 1, wherein the jack frame comprises a quad jack frame that includes at least four rows of bantam ports.

6. The telecommunications module of claim 1, wherein the jack frame comprises a tri jack frame that includes at least three rows of bantam ports.

7. A telecommunications module comprising:
   a quad jack frame on a front side of the telecommunications module and including a plurality of bantam jack ports arranged in four rows;
   a main printed circuit board coupled to the quad jack frame;
   a secondary printed circuit board;
   a first replaceable back plate of the telecommunications module including a first equipment input/output field comprising a plurality of connectors of a first connection type that is interchangeable with a second replaceable back plate including a second equipment input/output field comprising a plurality of connectors of a second connection type different from the connectors of the first connection type, wherein the first replaceable back plate is coupled to:
   a back side of the main printed circuit board; and
   the secondary printed circuit board.

8. The telecommunications module of claim 7, wherein the first equipment input/output field includes RJ-48 connections.

9. The telecommunications module of claim 7, wherein the first equipment input/output field includes Insulation Displacement connections.

10. The telecommunications module of claim 7, wherein the first equipment input/output field includes wire wrap connections.

11. The telecommunications module of claim 7, wherein the first equipment input/output field includes Bayonet Neill-Concelman connections.

12. The telecommunications module of claim 7, wherein the first replaceable back plate is configured to snap connect and snap disconnect to the back side of the main printed circuit board.

13. The telecommunications module of claim 7, wherein the first connection type is RJ-48 and the second connection type is wire wrap.

14. The telecommunications module of claim 7, wherein the first connection type is RJ-48 and the second connection type is Insulation Displacement.

15. The telecommunications module of claim 7, wherein the main printed circuit board is configured to receive power from a telecommunications rack and to provide power to the secondary printed circuit board.

16. A telecommunications module comprising:
a quad jack frame on a front side of the telecommunications module and including a plurality of bantam jack ports arranged in at least four rows;
a main printed circuit board including a front cross connect field coupled to the quad jack frame and configured to receive power for the telecommunications module;
a secondary printed circuit board including an equipment input/output field coupled to the main printed circuit board and configured to receive telecommunications signals from the main printed circuit board;
a first replaceable back plate of the telecommunications module including a first equipment input/output field comprising a plurality of connectors of a first connection type that is interchangeable with a second replaceable back plate including a second equipment input/output field comprising a plurality of connectors of a second connection type different from the connectors of the first connection type; and wherein the first replaceable back plate is coupled to a back side of the main printed circuit board and the secondary printed circuit board.

17. The telecommunications module of claim 16, wherein the front cross connect field comprises RJ-48 connections.

18. The telecommunications module of claim 16, wherein the front cross connect field comprises Insulation Displacement connections.

19. The telecommunications module of claim 16, wherein the front cross connect field comprises wire wrap connections.

20. A telecommunications system comprising:
a rack;
one or more chassis coupled to the rack;
one or more modules coupled to each chassis, each module comprising:
a quad jack frame on a front side of the module and including a plurality of bantam jack ports arranged in four rows;
a main printed circuit board coupled to the quad jack frame;
a secondary printed circuit board; and
a first replaceable back plate of the module including a first equipment input/output field comprising a plurality of connectors of a first connection type that is interchangeable with a second replaceable back plate including a second equipment input/output field comprising a plurality of connectors of a second connection type different from the connectors of the first connection type, wherein the first replaceable back plate is coupled to:
a back side of the main printed circuit board; and
the secondary printed circuit board.

21. The telecommunications system of claim 20, wherein the first equipment input/output field includes RJ-48 connections.

22. The telecommunications system of claim 20, wherein the first equipment input/output field includes Insulation Displacement connections.

23. The telecommunications system of claim 20, wherein the first equipment input/output field includes wire wrap connections.

24. The telecommunications system of claim 20, wherein the first equipment input/output field includes Bayonet Neill-Concelman (BNC) connections.

* * * * *